United States Patent
Edpalm et al.

(10) Patent No.: US 10,824,872 B2
(45) Date of Patent: Nov. 3, 2020

(54) METHOD FOR IDENTIFYING EVENTS IN A MOTION VIDEO

(71) Applicant: Axis AB, Lund (SE)

(72) Inventors: Viktor Edpalm, Lund (SE); Erik Andersson, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 215 days.

(21) Appl. No.: 15/851,028

(22) Filed: Dec. 21, 2017

(65) Prior Publication Data

US 2018/0173956 A1 Jun. 21, 2018

(30) Foreign Application Priority Data

Dec. 21, 2016 (EP) ..................................... 16205865

(51) Int. Cl.
*G06K 9/00* (2006.01)
*G06K 9/62* (2006.01)
(Continued)

(52) U.S. Cl.
CPC ..... *G06K 9/00718* (2013.01); *G06K 9/00771* (2013.01); *G06K 9/4628* (2013.01);
(Continued)

(58) Field of Classification Search
CPC ............. G06K 9/00718; G06K 9/6262; G06K 9/6293; G06K 9/6256; G06K 9/6271;
(Continued)

(56) References Cited

U.S. PATENT DOCUMENTS

| | | | | |
|---|---|---|---|---|
| 2005/0074161 A1* | 4/2005 | Ancona | .............. | A63B 71/0605 382/154 |
| 2007/0228703 A1* | 10/2007 | Breed | .................. | B60N 2/0232 280/735 |

(Continued)

OTHER PUBLICATIONS

Nair, Vinod, and James J. Clark. "An unsupervised, online learning framework for moving object detection." In Proceedings of the 2004 IEEE Computer Society Conference on Computer Vision and Pattern Recognition, 2004. CVPR 2004., vol. 2, pp. II-II. IEEE, 2004. (Year: 2004).*

(Continued)

*Primary Examiner* — Carol Wang
(74) *Attorney, Agent, or Firm* — Volpe Koenig

(57) ABSTRACT

A method for identifying events in a scene captured by a motion video camera comprises two identification processes, a temporary identification process and a long-term identification process. The temporary process includes: analyzing pixel data from captured image frames and identifying events; registering camera processing data relating to each image frame subjected to the identification of events; and adjusting weights belonging to an event identifying operation, wherein the weights are adjusted for achieving high correlation between the result from the event identifying operation and the result from the identification based on analysis of pixels from captured image frames of the captured scene. The long-term identification process includes: identifying events in the captured scene by inputting registered camera processing data to the event identifying operation. The temporary identification process is then executed during a predetermined time period and the long-term identification process is executed after the predetermined initial time has expired.

24 Claims, 2 Drawing Sheets

(51) Int. Cl.
*G06K 9/46* (2006.01)
*G06N 3/04* (2006.01)
*H04N 7/18* (2006.01)
*G06N 3/08* (2006.01)

(52) U.S. Cl.
CPC ......... *G06K 9/6256* (2013.01); *G06K 9/6262* (2013.01); *G06K 9/6271* (2013.01); *G06K 9/6293* (2013.01); *G06N 3/0445* (2013.01); *G06K 2009/00738* (2013.01); *G06N 3/084* (2013.01); *H04N 7/183* (2013.01)

(58) Field of Classification Search
CPC ............. G06K 9/4628; G06K 9/00771; G06K 9/6267; G06K 9/00711; G06K 2009/00738; H04N 7/183; G06N 3/0445; G06N 3/084
See application file for complete search history.

(56) References Cited

U.S. PATENT DOCUMENTS

| | | | | |
|---|---|---|---|---|
| 2012/0290511 | A1* | 11/2012 | Frank | G06F 3/013 706/12 |
| 2015/0052561 | A1* | 2/2015 | Austin | H04N 21/44222 725/46 |
| 2015/0261298 | A1* | 9/2015 | Li | G06F 3/017 345/156 |
| 2016/0171852 | A1 | 6/2016 | Lin et al. | |
| 2017/0032246 | A1* | 2/2017 | Knittel | G06N 3/084 |
| 2017/0161555 | A1* | 6/2017 | Kumar | G06K 9/00355 |
| 2017/0161607 | A1* | 6/2017 | English | G06F 3/017 |
| 2017/0255832 | A1* | 9/2017 | Jones | G06K 9/00718 |
| 2017/0311095 | A1* | 10/2017 | Fitz | H04R 3/005 |
| 2017/0344829 | A1* | 11/2017 | Lan | G06N 3/0445 |
| 2018/0082172 | A1* | 3/2018 | Patel | G06N 3/0472 |
| 2018/0099646 | A1* | 4/2018 | Karandikar | B60S 1/0844 |
| 2018/0137390 | A1* | 5/2018 | Brundage | G06K 9/00624 |

OTHER PUBLICATIONS

Awad, Mariette, and Yuichi Motai. "Dynamic classification for video stream using support vector machine." Applied Soft Computing 8, No. 4 (2008): 1314-1325. (Year: 2008).*
Saxena, Ankita, Deepak Kumar Jain, and Ananya Singhal. "Hand gesture recognition using an android device." In 2014 Fourth International Conference on Communication Systems and Network Technologies, pp. 819-822. IEEE, 2014. (Year: 2014).*
Wang, Shengke, Long Chen, Zixi Zhou, Xin Sun, and Junyu Dong. "Human fall detection in surveillance video based on PCANet." Multimedia tools and applications 75, No. 19 (2016): 11603-11613. (Year: 2016).*
Delachaux, Benoît, et al. "Indoor activity recognition by combining one-vs.-all neural network classifiers exploiting wearable and depth sensors." In International Work-Conference on Artificial Neural Networks, pp. 216-223. Springer, Berlin, Heidelberg, 2013. (Year: 2013).*
"Deep Representation for Abnormal Event Detection in Crowded Scenes", Feng et al.; Proceedings of the 2016 ACM on Multimedia Conference, MM '16, Oct. 15-19, 2016, pp. 591-595, XP055374635.
"Combined frame-and-event-based detection and tracking", Liu et al.; 2016 IEEE International Symposium on Circuits and Systems (ISCAS), IEEE, May 22, 2016, pp. 2511-2514, XP032942109.
"Multi-camera Spatio-temporal Fusion and Biased Sequence-data Learning for Security Surveillance", Wu et al., Proceedings of the 11th, ACM International Conference on Multimedia, MM'03, Berkeley, CA, Nov. 2-8, 2003; New York, NY, ACM, US, pp. 528-538, XP058170147.
"Motion Sequence Recognition with Multi-sensors Using Deep Convolutional Neural Network", Zhang et al., In: 7th International Conference on Knowledge Management in Organizations: Service and Cloud Computing, Jun. 26, 2015, Springer Berlin Heidelberg, Berlin, Heidelberg, XP055374644.
EP 16 20 5865.5 European Search Report (Mar. 31, 2017).

* cited by examiner

METHOD FOR IDENTIFYING EVENTS IN A MOTION VIDEO

BACKGROUND

Surveillance and/or monitoring systems of today are many times arranged to detect events, such as movement, intrusion, violence, loitering, left behind items, etc. By making the systems detect and recognize events occurring in the monitored scenes the operation of this type of surveillance and/or monitoring systems are facilitated as less manpower will be required for monitoring in a system having many simultaneously surveyed scenes. However, having the system recognize and detect the events requires a lot of processing power. One reason for this is that a substantial amount of both spatial and temporal image data is required in order to indicate a detected and/or recognized event.

SUMMARY

Event detection that requires decreased amount of processing power and other computing resources is set forth in the method according to claim 1 and by means of a system according to claim 12. Further embodiments are presented in the dependent claims.

In particular, according to some embodiments, the method for identifying events in a scene captured by a motion video camera comprises two identification processes, a temporary identification process and a long-term identification process. The temporary identification process includes identifying events in the captured scene by analyzing pixel data from captured image frames, registering camera processing data relating to each image frame subjected to the identification of events, and adjusting weights belonging to an event identifying operation arranged to use registered camera processing data as input, wherein the weights are adjusted for increasing correlation between the result from the event identifying operation and the result from the identification based on analysis of pixels from captured image frames of the captured scene. The long-term identification process includes identifying events in the captured scene by inputting registered camera processing data to the event identifying operation. Further, the temporary identification process is executed during a predetermined time period and the long-term identification process is executed after the predetermined initial time has expired. One advantage of basing event identification on camera processing data is that processing power required for event detection is decreased as the amount of data that is processed is much lower than for pixel data representing images. Moreover, as the camera processing data may be depending to a large degree on the surroundings of the motion video camera and how the motion video camera has been installed, e.g. high up looking down, low at ground level looking up, at shoulder height of a human, in the travel direction of movement in the scene, orthogonal to the travel direction of movement in the scene, for traffic surveillance, for tracking people movement, in a square, in a parking lot, in a garage, in a shop, in a shopping mall, alongside roads, etc., the quality of the result from the long-term identification process is significantly increased by the unique training provided for the motion video camera in the temporary identification process. Hence, the use of decreased amount of data becomes enabled by means of unique training for the specific motion video camera at a particular position. Hence, the two step process of initial and unique training and then event identification based on the training and low data rate camera processing data combines to the result of allowing event detection at low processing power requirements. Hence, the event identification may also be used by a monitoring camera having limited computing resources.

Further, in some embodiments the temporary identification process is started when the motion video camera is initially set up and in these embodiments or some other embodiments the temporary identification process is started upon request. Hence, the training of the event detection operation using camera processing data may be uniquely trained for the environment of the camera and retrained if moved to a different environment. The request for starting the temporary identification process may be an instruction inputted to the motion video camera by a user.

In yet further embodiments the temporary identification process is executed by a device connected to the motion video camera via a network. The advantage of this is that the motion video camera is that the training of the temporary identification process may be executed on a device of high computing or processing capacity in relation to a motion video camera having low computing or processing capacity.

In some embodiments the weights belonging to the event identifying operation are stored during the temporary identification process in a device connected to the motion video camera via a network. The weights belonging to the event identifying operation are in some of these embodiments transferred to the motion video camera via the network.

In further embodiments the weights and code of the event identifying operation using camera processing data as input are executed in the motion video camera in the long-term identification process. The advantage of this is that the event identifying process makes it possible to have the motion video camera contribute to the network load only when an event is identified. Accordingly, the network load may be decreased when no events are present, e.g. no data at all have to be sent, and the network load may also be decreased when an event is detected as only a limited amount of data is required to be sent in order to identify that an event has occurred.

Some embodiments further comprise restarting the temporary identification process in response to a failed event identification in the long-term identification process.

In some embodiments the adjusting of weights belonging to an event identifying operation arranged to use registered camera processing data as input is part of a neural network training session.

In other embodiments the event identifying operation is performed by a neural network.

According to another aspect a system including a motion video camera and a processing device arranged to communicate via a communication network is arranged to perform the method according to any of the above embodiments. The advantages presented in relation to the above embodiments are applicable to corresponding embodiments related to the system.

In some embodiments the processing device is arranged to perform temporary identification process. In other embodiments the motion video camera is arranged to perform the long-term identification process. In yet other embodiments the processing device is arranged to perform the long-term identification process.

A further scope of applicability of the present teachings will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description. Hence, it is to be understood that this is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages will become apparent from the following detailed description of a presently preferred embodiment, with reference to the accompanying drawings, in which.

Further, in the figures like reference characters designate like or corresponding parts throughout the several figures.

DETAILED DESCRIPTION

Figure 1:
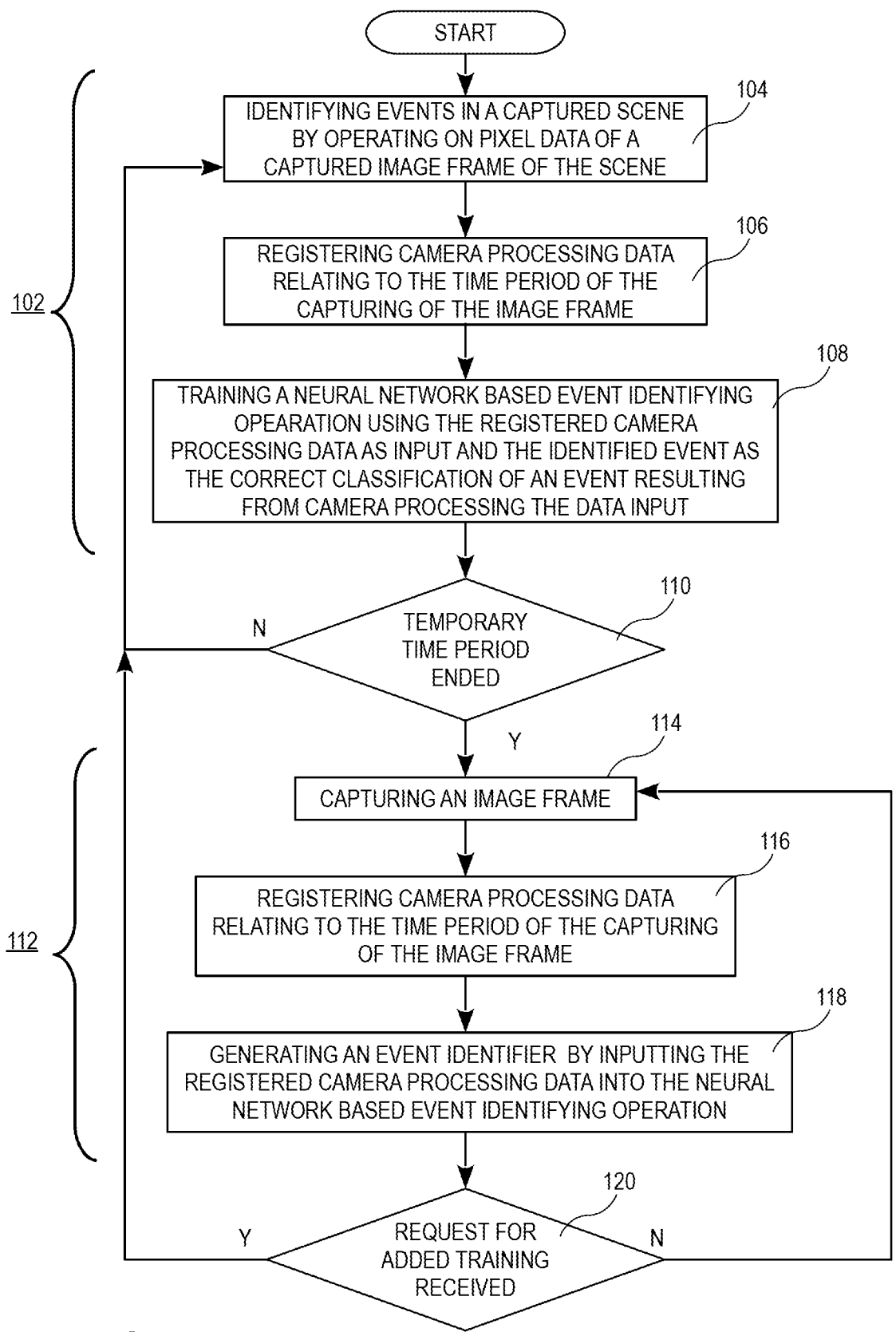
FIG. 1 is a flowchart of a process of one or more embodiments.

According to one embodiment the detection and identification of an event is based on camera processing data instead of direct image data. Camera processing data may for instance be a value indicating the data rate of an encoded video stream captured by a camera, time points relating to the rest of the registered camera processing data, a value indicating an auto focus distance, a value indicating the setting of an auto white balance function, values relating to auto exposure settings, e.g. aperture, shutter time, gain, electronic image stabilization data, a value of signal to noise ratio, a value indicating the contrast in the captured frame, a value indicating the data rate sent to the network, a value indicating CPU usage, a value indicating memory usage, data from a gyro or an accelerometer, position data from a PTZ head connected to the camera, data from a radar sensor, data from a PIR-sensor, etc. The camera processing data may alternatively or in addition to the above-mentioned be formed from sequences of the above-mentioned values, i.e. an exposure curve, curve representing the variation in data rate over a time period, the curve representing variations in distance indicated by autofocus, etc. Additionally, various values, both final and or intermediate ones, from specific image encoding schemes implemented in the image processing of the camera may be representing camera processing data. As evident from the examples of camera processing data above, the amount of data to process may be significantly decreased when using camera processing data instead of image pixel data representing an entire frame.

In order to facilitate the design of processes for detecting the events using camera processing data a neural network designed for classification is trained to detect the events using camera processing data as inputs. Examples of such neural networks are neural networks designed for classification, convolutional neural networks designed for classification, recurrent neural networks, recursive neural networks, deep belief networks, the Boltzmann machines, etc.

One problem of training a general classification neural network to be used as event detectors in various cameras or based on a processing some of the data is not available in all cameras and some of the data my vary significantly between different cameras. One reason for variations between different cameras are that they are installed in different environments, at different view-angles, at different light conditions, etc. and/or that the cameras are different cameras.

According to an embodiment this problem is addressed by implementing a two-step event detection process. During an initial temporary identification process a well-known event identification process is used to identify events in the captured image frames based on pixel information in the captured frames, i.e. the pixel data captured in a sequence of image frames are analyzed in order to identify events occurring in the captured scene. At the same time in this temporary identification process a set of various camera processing data is registered. The registered camera processing data is used as input to train the neural network to arrive at the same identified event as identified in the process identifying events based on pixel data. This temporary identification process is ended when the neural network has reached an acceptable confidence level or when an operator tells the process to stop. When the temporary identification process has stopped the event identification is carried on by the trained neural network which is receiving camera processing data as inputs in the long term identification process.

According to some embodiments, the event identification process is performed as described in the flowchart of FIG. 1. The method for identifying events starts with the temporary identification process 102, in which an event in a captured scene is identified by operating on pixel data of one image frame or a sequence of captured image frames of the scene, step 104. Further, camera processing data relating to the time period corresponding to the captured frame/frames used in identifying the event is registered, step 106. Then, the registered camera processing data is used as input in training of a neural network based event identifying operation and the event identified from the pixel based event identifier operation is used as the correct classification of an event resulting from this input of registered camera processing data, step 108. The training operation may include the adjustment of weights in the nodes of the neural network. The weights are adjusted so that the classification resulting from the input of camera processing data is close to the classification identified by the pixel-based event identifying operation. Then the process continues by checking if a predefined time period for the temporary identification process is ended, step 110. If the time period for the temporary identification process has not ended, then the process returns to step 104 and continues in the temporary identification process. If the time period for the temporary identification process has ended, then the process continues in the long-term identification process by capturing the next image frame, step 114, and registering camera processing data relating to the time period of the capturing of the image frame, step 116. Then the camera processing data relating to the time period of the captured image frame is sent as input to the neural network-based event identifying operation, step 118. The input to the neural network-based event identifying operation may alternatively or in addition include camera processing data relating to a longer time period than the time period of one image frame, e.g. including more samples of the camera processing data spread over a longer time period. Then the process check if a request for added training has been received, step 120. If a request for added training has not been received the long term identification process 112 is continued by returning the process 114. If a request for added training has been received process returns to step 104 of the temporary identification process.

The implemented neural network may for instance be a recurrent neural network (RNN) and the learning algorithm used for such RNN may be a learning algorithm such as backpropagation or conjugant gradient. The camera processing data may be seen as a time series and is initially trained and later processed for classification of events. Many of the existing implementations of RNN are able to process univariate time series and/or multivariate time series, i.e. the RNN are able to process a sequence of vectors where the vector contains one component and/or multiple components. For example, processing of a univariate time series may be processing of a sequence of values indicating the data rate of an encoded video stream. An example of processing of a multivariate time series may then be processing of a sequence of vectors where each vector include a value indicating the data rate of an encoded video stream and a value indicating white balance. Any combination of camera processing data are possible and the combinations should not be limited to combining only two different data types but may very well combine a plurality of data types. The method described may also be used on data that is not time series and in such cases the method may be using a neural network suitable for that particular classification operation.

Now referring to FIG. 2, a system according to embodiments comprises a motion video camera 210 and a processing device 212 connected to each other via a communication network 214, hereinafter referred to as network 214. The processing device 212 may for instance be a PC, a workstation, a server, or any other type of network connectable device enabled to process data. The network 214 may be any type of network, e.g. Ethernet, Wi-Fi, LAN, WAN, the Internet, cellular connection, public switched telephone network, etc. The two identification processes, the temporary identification process 102 and the long-term identification process 112, may be arranged to be performed in any one of the two devices, i.e. the motion video camera 210 and the processing device 212. In case the motion video camera has a lot of spare processing power it may execute both processes. In embodiments where the motion video camera is very limited in its capacity when it comes to processing power, then both processes may be executed in the processing device 212, which then is receiving the data to operate on from the motion video camera. In this case the gain of using the processes is that the network load may be decreased when the event identifying process has switched of the temporary identification process as the long-term identification process does not require any image data, such data are not necessarily transmitted by the camera in that stage.

In yet another scenario, the temporary identification process, which is the process that includes the learning stage of the neural network and the analysis of entire image frames, is accordingly the most processing requiring of the two identification processes and is therefore arranged to be executed in the processing device 212. While the long-term identification process then is executed in the motion video camera as this process require much less processing and then the amount of data transmitted on to the network by the camera may be decrease very much, in particular in the long term because the motion camera may avoid sending data as long as no event is detected.

The motion video camera includes a lens 216, an image sensor 218, an image processing unit 220, which in combination are arranged to capture light in the scene of the camera view and generate digital image data from that light. In many motion video cameras the compression and encoding of the captured digital image data is performed in the image processing device. Further, the motion video camera 210 includes a central processing unit 222 arranged to execute programs related to more general functions of the motion camera device. The central processing unit 222 is typically not involved in image processing as such operations are processed by the image processing device. The motion video camera also includes a volatile memory 224 and a non-volatile memory 226, wherein the volatile memory 224 mostly is used as a working memory for temporary storage of data and/or program code during execution by a processing device and wherein the non-volatile memory 226 is arranged for storage of data and code that are to be long term stored in the motion camera. Further, the motion video camera 210 includes a camera processing data registration module 228, an event identifying operation module 230, and a network interface 232. The camera processing data registration module 228 is arranged to retrieve or receive camera processing data from various physical and/or logical interfaces in the motion video camera. For example, the current data rate of the image stream generated may be retrieved from the image processor 220 or from the network interface 232, a temperature may be received from an interface to a temperature sensor in the camera, etc. The event identifying operation module 230 may not be present in the motion video camera 210 until the temporary identification process, which may be running on the processing device 212, has finished with adjusting the event identifying operation arranged to use registered camera processing data, e.g. the neural network that operates using camera processing data as input. The network interface 232 may be any known type of network interface for connecting the camera to the network 214.

The processing device 212 also includes a network interface 234, a non-volatile memory 236, a volatile memory 238, and a central processing unit 240. The network interface 234 is arranged to connect the processing device to the network and may be implemented in any known way in order to achieve network communication over the network 214 to the motion video camera 210. The central processing unit 240, the volatile memory 238, and the non-volatile memory 236 are arranged to execute program code, store temporary data and/or program code, and store long term data and/or program code. Further, the processing device 212 includes a pixel based event identifying operation module 242 and an event identifying operation training module 244. The pixel based event identifying operation module 242 and the event identifying operation training module 244 may be implemented as program code stored and executed in the processing device 212 by the central processing unit 240.

The pixel based event operation may include one or a plurality of well-known event identifying operations that are operating on one image frame at a time or a sequence of image frames at a time by analyzing pixels and characteristics of pixels in the image frames. The image frames are image frames captured by the motion video camera and in the system where the temporary process is performed in the processing device 212 these captured image frames are sent to the processing device 212 over the network. Examples of pixel based event identifying operations are: vehicle arriving in scene, type of vehicle arriving in scene, speed of vehicle arriving in scene, number of vehicles arriving in the scene, etc. The event pixel based identifying operations may also or instead relate to person arriving in scene, animal arriving in a scene, a specific object arriving in the scene, etc., also including the variations presented for vehicles above. Further, the pixel based event identifying operations may include identifying that motion occurs in the scene, loitering, large crowd gathering, traffic jam, snow, rain, smog, deteriorated image due to dirt on the housing, lens out of focus, anomalies, etc.

Figure 2:
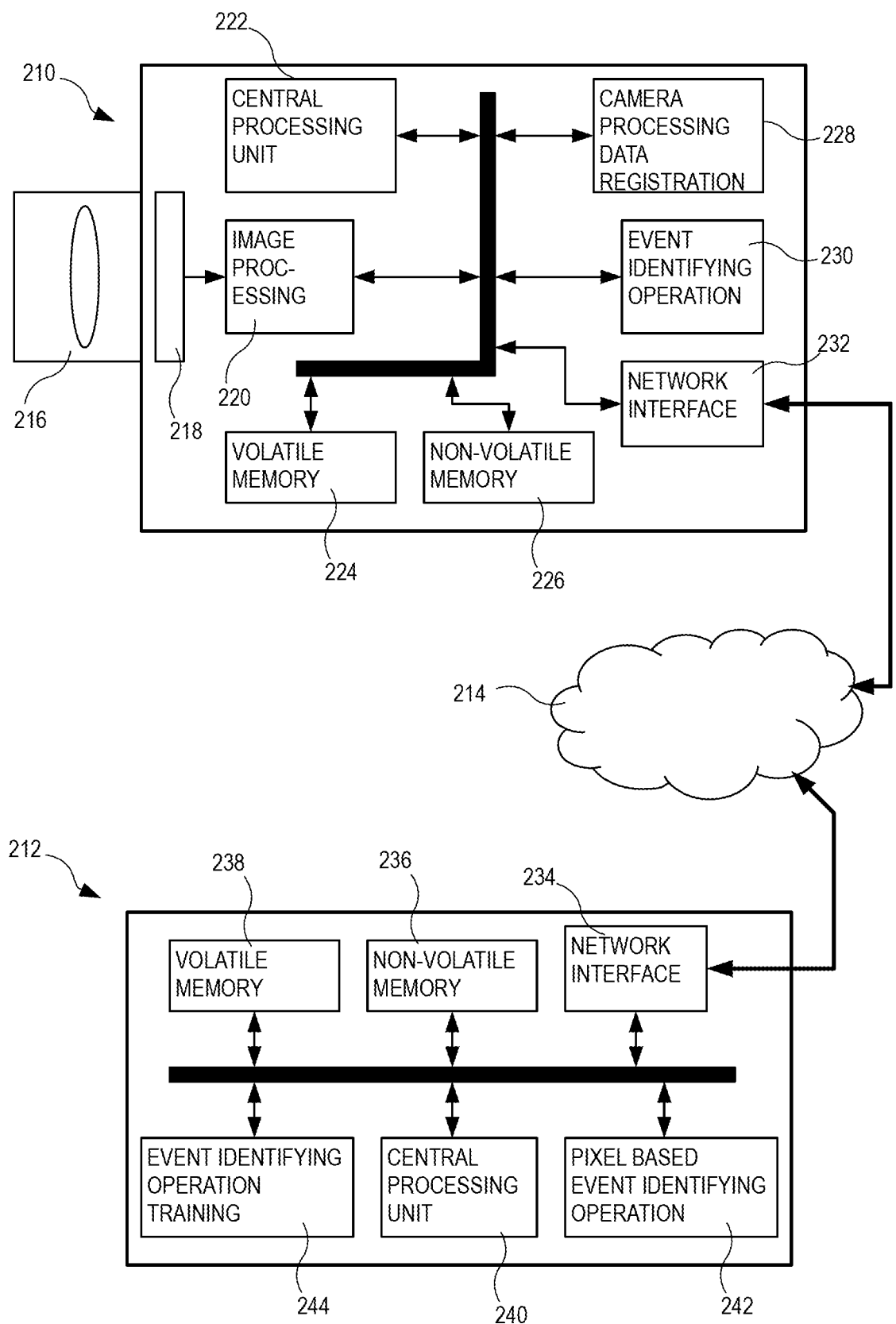
FIG. 2 is a schematic block diagram of a system implementing one or more embodiments.

In the system depicted in FIG. 2, where the temporary process is performed in the processing device, the camera transmits, at least during the execution of the temporary process, a video stream including image frames of the captured scene and camera processing data relevant for the motion video camera and/or the setup. The selection of which types of camera processing data to operate on is limited by the availability of various camera processing data, see examples above, in the particular camera. Further, the types of camera processing data may be further limited. However, as the entire available data set representing the camera processing data for a particular camera is likely to be relatively small the entire set may often be used. The training of the neural network representing the event identifying operation is executed by using the pixel based event identifying operation as triggering a training input, i.e. when an even is identified by the pixel based event identifying operation the process of training the neural network arrange camera processing data representing a time period before the identification to the training process as input and adjusts weights of the neural network in the training process in order to make the neural network more likely to identify the inputted camera processing data as the same event as the event detected by the pixel based event identifying operation.

Additional training of the system may be initiated as described above and accordingly include a restart of the temporary identification process. In addition or alternatively, further training or improvement of the event identifying operation arranged to use the camera processing data as input may be initiated in response to the event identifying operation classifying an event and resulting in a confidence value generated by the event identifying operation for the specific classification being lower than a predetermined threshold. The lower the confidence value the more uncertain the classification is. Such further training will start by retrieving the pixel data and the camera processing data relating to a time period including the time point for the event getting the low confidence classification. These data sets will then be processed by the training operation, i.e. by the pixel based event identifying operation and the process of adjusting weights of the event identifying operation, in order to improve the event identifying operation. Then the improved event identifying operation is arranged to replace the previous event identifying operation.

As mentioned earlier, the advantages of identifying events based on camera processing data are many. In order to facilitate the understanding of such advantages the use of image stream data rate of temporally compressed video as camera processing data will be described a bit more detailed below. The image stream data rate is a measure representing the amount of data generated by a temporally compressing video encoder in the image processing device 220 of the camera 210 that is capturing motion video of the scene in which event detection is desired. The amount of data generated by the encoder depends on the amount of change between consecutively captured image frames. For example, an image sequence of a scene having essentially no moving objects will result in less encoded data than an image sequence of the scene having a lot of movement. Hence the amount of data after the encoding step depends heavily on variations in consecutively captured images. This may also be described as the amount of encoded image data that being generated by the encoder is being dependent on the number of pixels on the image sensor that is affected by the movements in the scene. For instance, an object close to the camera or a big object in the scene will have an impact on more pixels on the image sensor than objects far from the camera or a small object. Accordingly, the amount of data is an effect of the temporal compression of the image information.

According to certain embodiments a plurality of data rates, representing the amount of data per unit of time in a data stream including the motion video of the monitored scene, are measured and registered sequentially and is included in the camera processing data. Thereby a dataset representing the variation in data rate over time is registered. The data rate may be measured or retrieved from various places in the system. For example, the data rate may be measured or retrieved at the encoder of in the image processing device 220 of the camera 220, at the network interface 232 of the camera, at a switch or a router in the network 214, or at a network interface 234 or a decoder in a processing device 212 connected to the network 214. The data rate may be measured directly on a stream representing the image stream, but may also be measured by measuring the data rate of network packets transmitting the motion video. The process of measuring the data rate of a data stream or any data transmission is well known to the person skilled in the art.

The dataset representing the data rate over time may be represented using a very low amount of data, in particular compared with the data required to represent a motion video stream. For example, consider including in the dataset representing the variation in data rate over time a value or a data entry representing the amount of data used in representing each image in the image stream. If the camera is a ten megapixel camera the size of an intra frame, i.e. spatially encoded, would be about 2.5 MB, using any of the standard encoders. Even a ten megapixel frame being encoded using a lossless coding scheme would not have a size much bigger than 10 MB. In order to register a value or a data entry representing every size between 0 MB-10 MB you will only need three bytes, as three bytes would be able to represent values of over 16 million. In case the resolution of the data rate is not as important it may even be possible to represent the data rate using two, or even one byte(s). The data needed to represent the data rate in the dataset may easily be almost a million times smaller than the data used for representing one intra frame. In streaming video the data used per frame will of course be smaller, as the inter frames are temporally encoded. However, the data set used may not need to include the size of every frame but may represent the accumulated data amount over a predetermined time period. In one embodiment a frame size is registered as a representation of the data rate. The frame size indicates the amount of data needed to encode a frame. The frame size is registered using 4 bytes (32 bits) and the frame size is registered for each frame. The frames are captured at 30 frames per second, and accordingly the data used for detection of events may is in this embodiment 0.12 Kb/s. This is much lower than the data rate of a normal motion video stream of 6 000 Kb/s.

Accordingly, when a system according to the present teachings has switched to the long-term identification process the radical decrease in the amount of data required in order to detect an event will significantly affect the processing power requirements of the event identification operation in relation to the pixel based event detection operation. Even if the event identification operation is designed to have additional information types as input, as mentioned above, these added data sets will still be very small in relation to the data amount needed to represent an image frame or a sequence of image frames.

What is claimed is:

1. A method for identifying events in a scene captured by a motion video camera, the method comprising a temporary identification process and a long-term identification process;
the temporary identification process includes:
identifying events in the captured scene by analyzing pixel data from captured image frames;
registering camera processing data relating to the image frames subjected to the identification of events, wherein the camera processing data comprises at least one of: a data rate of an encoded video stream captured by a camera, an auto focus distance, a setting of an auto white balance function, auto exposure settings, shutter time, gain, electronic image stabilization data, a signal to noise ratio, a contrast in a captured frame, a data rate sent to a network, a central processing unit (CPU) usage, a memory usage, data from a gyro or an accelerometer, and position data from a pan-tilt-zoom (PTZ) head connected to the camera; and
training a neural network based event identifying operation using the registered camera processing data relating to the image frames subjected to the identification of events as input and the identified events as a correct classification of an event resulting from the neural network based event identifying operation; and
the long-term identification process includes:
registering camera processing data relating to image frames captured subsequent to the image frames used for the analysis of pixel data; and
identifying events in the captured scene by inputting the registered camera processing data relating to image frames captured subsequent to the image frames used for the analysis of pixel data to the trained neural network based event identifying operation;
wherein the temporary identification process is executed during a predetermined time period and wherein the long-term identification process is executed after the predetermined time period has expired.

2. The method according to claim 1, wherein the training of the neural network based event identifying operation comprises adjusting weights belonging to nodes of the neural network based event identifying operation, wherein the weights of the nodes of the neural network based event identifying operation are adjusted such that a classification of an event resulting from the neural network based event identifying operation is close to a classification of an event identified by the analysis of pixel data from the captured image frames.

3. The method according to claim 2, wherein the weights are stored during the temporary identification process in a device connected to the motion video camera via a network.

4. The method according to claim 3, wherein the weights are transferred to the motion video camera via the network.

5. The method according to claim 1, wherein the temporary identification process is started upon request.

6. The method according to claim 5, wherein the request is an instruction inputted to the motion video camera by a user.

7. The method according to claim 1, wherein the temporary identification process is executed by a device connected to the motion video camera via a network.

8. The method according to claim 1, wherein weights and a code of the neural network based event identifying operation are executed in the motion video camera in the long-term identification process.

9. The method according to claim 1, further comprising:
restarting the temporary identification process in response to a confidence value generated by the neural network based event identification operation in the long-term identification process being below a predetermined threshold.

10. A system including a motion video camera and a processing device arranged to communicate via a communication network, the system comprising:
the processing device, configured to use a temporary identification process, including:
a network interface of the processing device operatively coupled to a central processing unit (CPU) of the processing device, the network interface of the processing device and the CPU of the processing device configured to identify events in the captured scene by analyzing pixel data from captured image frames;
the CPU of the processing device configured to register camera processing data relating to the image frames subjected to the identification of events, wherein the camera processing data comprises at least one of: a data rate of an encoded video stream captured by a camera, an auto focus distance, a setting of an auto white balance function, auto exposure settings, shutter time, gain, electronic image stabilization data, a signal to noise ratio, a contrast in a captured frame, a data rate sent to a network, a CPU usage, a memory usage, data from a gyro or an accelerometer, and position data from a pan-tilt-zoom (PTZ) head connected to the camera; and
the CPU of the processing device configured to train a neural network based event identifying operation using the registered camera processing data relating to the image frames subjected to the identification of events as input and the identified events as a correct classification of an event resulting from the neural network based event identifying operation; and
the motion video camera, configured to use a long-term identification process, including:
a CPU of the motion video camera configured to register camera processing data relating to image frames captured subsequent to the image frames used for the analysis of pixel data; and
a network interface of the motion video camera operatively coupled to the CPU of the motion video camera, the network interface of the motion video camera and the CPU of the motion video camera configured to identify events in the captured scene by inputting the registered camera processing data relating to image frames captured subsequent to the image frames used for the analysis of pixel data to the trained neural network based event identifying operation;
wherein the temporary identification process is executed during a predetermined time period and wherein the long-term identification process is executed after the predetermined time period has expired.

11. The system of claim 10, wherein the training of the neural network based event identifying operation comprises adjusting weights belonging to nodes of the neural network based event identifying operation, wherein the weights of the nodes of the neural network based event identifying operation are adjusted such that a classification of an event resulting from the neural network based event identifying operation is close to a classification of an event identified by the analysis of pixel data from the captured image frames.

12. The system of claim 10, wherein the temporary identification process is started upon request.

13. The system of claim 12, wherein the request is an instruction inputted to the motion video camera by a user.

14. The system of claim 10, further comprising:
the processing device configured to restart the temporary identification process in response to a confidence value generated by the neural network based event identification operation in the long-term identification process being below a predetermined threshold.

15. A motion video camera comprising:
the motion video camera configured to use a temporary identification process, including:
a network interface operatively coupled to a central processing unit (CPU), the network interface and the CPU configured to identify events in the captured scene by analyzing pixel data from captured image frames;
the CPU configured to register camera processing data relating to the image frames subjected to the identification of events, wherein the camera processing data comprises at least one of: a data rate of an encoded video stream captured by a camera, an auto focus distance, a setting of an auto white balance function, auto exposure settings, shutter time, gain, electronic image stabilization data, a signal to noise ratio, a contrast in a captured frame, a data rate sent to a network, a CPU usage, a memory usage, data from a gyro or an accelerometer, and position data from a pan-tilt-zoom (PTZ) head connected to the camera; and
the CPU configured to train a neural network based event identifying operation using the registered camera processing data relating to the image frames subjected to the identification of events as input and the identified events as a correct classification of an event resulting from the neural network based event identifying operation; and
the motion video camera, configured to use a long-term identification process, further including:
the CPU configured to register camera processing data relating to image frames captured subsequent to the image frames used for the analysis of pixel data; and
the network interface and the CPU configured to identify events in the captured scene by inputting the registered camera processing data relating to image frames captured subsequent to the image frames used for the analysis of pixel data to the trained neural network based event identifying operation;
wherein the temporary identification process is executed during a predetermined time period and wherein the long-term identification process is executed after the predetermined time period has expired.

16. The motion video camera of claim 15, wherein the training of the neural network based event identifying operation comprises adjusting weights belonging to nodes of the neural network based event identifying operation, wherein the weights of the nodes of the neural network based event identifying operation are adjusted such that a classification of an event resulting from the neural network based event identifying operation is close to a classification of an event identified by the analysis of pixel data from the captured image frames.

17. The motion video camera of claim 15, wherein the temporary identification process is started upon request.

18. The motion video camera of claim 17, wherein the request is an instruction inputted to the motion video camera by a user.

19. The motion video camera of claim 15, further comprising:
the motion video camera configured to restart the temporary identification process in response to a confidence value generated by the neural network based event identification operation in the long-term identification process being below a predetermined threshold.

20. A processing device comprising:
the processing device configured to use a temporary identification process, including:
a network interface operatively coupled to a central processing unit (CPU), the network interface and the CPU configured to identify events in the captured scene by analyzing pixel data from captured image frames;
the CPU configured to register camera processing data relating to the image frames subjected to the identification of events, wherein the camera processing data comprises at least one of: a data rate of an encoded video stream captured by a camera, an auto focus distance, a setting of an auto white balance function, auto exposure settings, shutter time, gain, electronic image stabilization data, a signal to noise ratio, a contrast in a captured frame, a data rate sent to a network, a CPU usage, a memory usage, data from a gyro or an accelerometer, and position data from a pan-tilt-zoom (PTZ) head connected to the camera; and
the CPU configured to train a neural network based event identifying operation using the registered camera processing data relating to the image frames subjected to the identification of events as input and the identified events as a correct classification of an event resulting from the neural network based event identifying operation; and
the processing device, configured to use a long-term identification process, further including:
the CPU configured to register camera processing data relating to image frames captured subsequent to the image frames used for the analysis of pixel data; and
the network interface and the CPU configured to identify events in the captured scene by inputting the registered camera processing data relating to image frames captured subsequent to the image frames used for the analysis of pixel data to the trained neural network based event identifying operation;
wherein the temporary identification process is executed during a predetermined time period and wherein the long-term identification process is executed after the predetermined time period has expired.

21. The processing device of claim 20, wherein the training of the neural network based event identifying operation comprises adjusting weights belonging to nodes of the neural network based event identifying operation, wherein the weights of the nodes of the neural network based event identifying operation are adjusted such that a classification of an event resulting from the neural network based event identifying operation is close to a classification of an event identified by the analysis of pixel data from the captured image frames.

22. The processing device of claim 20, wherein the temporary identification process is started upon request.

23. The processing device of claim 22, wherein the request is an instruction inputted to the motion video camera by a user.

24. The processing device of claim 20, further comprising:
   the processing device configured to restart the temporary identification process in response to a confidence value generated by the neural network based event identification operation in the long-term identification process being below a predetermined threshold.

\* \* \* \* \*